(12) United States Patent
Wolf-Monheim

(10) Patent No.: US 10,767,720 B2
(45) Date of Patent: Sep. 8, 2020

(54) METHOD FOR LEAF SPRINGS MADE OF FIBER-REINFORCED PLASTIC WITH INTEGRATED EYE BUSHINGS, AND LEAF SPRING MADE OF FIBER-REINFORCED PLASTIC

(71) Applicant: FORD GLOBAL TECHNOLOGIES, LLC, Dearborn, MI (US)

(72) Inventor: Friedrich Peter Wolf-Monheim, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 16/164,157

(22) Filed: Oct. 18, 2018

(65) Prior Publication Data

US 2019/0113095 A1 Apr. 18, 2019

(30) Foreign Application Priority Data

Oct. 18, 2017 (DE) .................. 10 2017 218 553

(51) Int. Cl.
   B60G 11/02 (2006.01)
   F16F 1/368 (2006.01)
   B32B 3/04 (2006.01)

(52) U.S. Cl.
   CPC ............ F16F 1/3686 (2013.01); B32B 3/04 (2013.01); *F16F 2224/0241* (2013.01); *F16F 2226/04* (2013.01); *F16F 2238/022* (2013.01)

(58) Field of Classification Search
   CPC ............ F16F 1/368; F16F 1/3686; B32B 3/04
   USPC ................................. 267/36.1, 41, 47, 148
   See application file for complete search history.

(56) References Cited

U.S. PATENT DOCUMENTS

| 3,900,357 A | 8/1975 | Huchette et al. |
| 3,968,958 A * | 7/1976 | Huchette ............... B29C 70/345 |
| | | 267/47 |
| 4,414,049 A | 11/1983 | Jones |

(Continued)

FOREIGN PATENT DOCUMENTS

| EP | 0215365 A2 | 3/1987 |
| JP | S57124141 A | 8/1982 |

OTHER PUBLICATIONS

Composite Leaf Spring. ASES Aviation Services & Support Inc. 2 pages.

(Continued)

*Primary Examiner* — Christopher P Schwartz
(74) *Attorney, Agent, or Firm* — Brooks Kushman P.C.; Ray Coppiellie

(57) ABSTRACT

A fiber-reinforced plastic leaf spring and a method for producing the fiber-reinforced plastic leaf spring are provided, which is suitable in particular for use in a motor vehicle. It has an elongate leaf spring main body which comprises a first eye bushing at a first end and a second eye bushing at a second end. The leaf spring main body and the first and second eye bushings are formed using at least a first layer and a second layer of a composite material. Each of the layers is guided along a centerline of the leaf spring main body to form the leaf spring main body and, to form the first and second eye bushings, is respectively wrapped around a bushing element having a first center axis and around a bushing element having a second center axis.

20 Claims, 3 Drawing Sheets

(56) References Cited

U.S. PATENT DOCUMENTS

| | | | | |
|---|---|---|---|---|
| 4,468,014 | A | * | 8/1984 | Strong .................... F16F 1/368 |
| | | | | 188/268 |
| 4,565,356 | A | | 1/1986 | Nickel |
| 4,696,459 | A | | 9/1987 | Woltron et al. |
| 4,749,534 | A | | 6/1988 | Robertson |
| 5,685,525 | A | * | 11/1997 | Oguri .................... B29C 53/083 |
| | | | | 267/148 |
| 7,722,065 | B2 | * | 5/2010 | Platner .................. B60G 11/10 |
| | | | | 267/148 |
| 9,194,451 | B2 | | 11/2015 | Voigt et al. |
| 2002/0158392 | A1 | * | 10/2002 | Petrina ................. F16F 1/3665 |
| | | | | 267/168 |
| 2012/0211931 | A1 | * | 8/2012 | Fane De Salis ........ F16F 1/368 |
| | | | | 267/158 |
| 2014/0001688 | A1 | * | 1/2014 | Shigematsu ............ F16F 1/368 |
| | | | | 267/158 |
| 2014/0284855 | A1 | * | 9/2014 | Spiegel ................. B60G 11/02 |
| | | | | 267/41 |

OTHER PUBLICATIONS

DE Examination Report DE 10 2017 218 553.8 filed Mar. 9, 2018. 4 pages.

* cited by examiner

METHOD FOR LEAF SPRINGS MADE OF FIBER-REINFORCED PLASTIC WITH INTEGRATED EYE BUSHINGS, AND LEAF SPRING MADE OF FIBER-REINFORCED PLASTIC

CROSS-REFERENCE TO RELATED APPLICATIONS

This application claims foreign priority benefits under 35 U.S.C. § 119(a)-(d) to DE Application 10 2017 218 553.8 filed Oct. 18, 2017, which is hereby incorporated by reference in its entirety.

TECHNICAL FIELD

Various embodiments of the present invention relate to a production method for a leaf spring made of fiber-reinforced plastic, or a composite leaf spring for suspension systems, in particular in vehicles. Various embodiments of the invention also relate to a leaf spring made of fiber-reinforced plastic.

BACKGROUND

Replacing steel components with fiber-reinforced plastic components, or composite components, is an important tool for cost- and weight-optimized solutions for future motor vehicles or automobiles. One example of this is leaf springs made of fiber-reinforced composite materials, which weigh up to 60% less than comparable steel components.

In addition, the mechanical properties of fiber-reinforced composite materials offer further advantages over conventional materials. Leaf springs made of fiber-reinforced composite material, also known as composite leaf springs, absorb energy more easily than steel and, when installed in the spring systems of the shock damping arrangement, improve the ride comfort of the occupants of the vehicle. In addition to greater fatigue resistance than steel springs, the onset of material failure in composite materials would be gradual and would therefore be identifiable in advance, making it possible to avoid the sudden, catastrophic failure of metal parts. Furthermore, fiber-reinforced plastic leaf springs are easily capable of withstanding typical ambient conditions. They are corrosion-resistant and resistant to salt damage in winter as well as to oil, gasoline and battery acid. In contrast to metal, it is also not necessary for composite leaf springs to be coated with a protective anticorrosion paint.

Composite leaf springs are usually produced by arranging reinforcing fibers in a plastic material such as an epoxy matrix or a matrix of other polymer resins. Typically, the fiber materials are provided in webs or rolls and are cut to size in a die prior to lay-up in the molds. They are then laid in the mold at a distance from one another, the mold being then filled with resin or another comparable polymer. A chemical reaction, by which the leaf spring is formed, is initiated by heat treatment. Another typical composite material is prepreg. In the case of prepreg, an alternative production method is used. In that context, a fiber-matrix semifinished product made of a textile pre-impregnated with reactive resins, or a fiber-reinforced resin system is formed to give a composite leaf spring by pressing and heat-treating.

Moreover, for the installation or assembly of the leaf springs, one or more so-called eye bushings are provided at the ends of the leaf springs. The integration of these cylindrical bushings at the ends of the leaf springs made of fiber-reinforced plastic material, without disrupting the fiber profile in order to obtain a robust, long-lived and cost-effective plastic leaf spring with integrated attachment devices, is a challenge.

In the prior art, US 2012/0211931 A1 discloses a composite leaf spring made of a fiber-reinforced body that is embedded in a cured resin, having a central section and opposite end sections. The fibers are arranged in multiple layers of a web which extend essentially completely, in the form of a continuous web, over the central section and any end sections of the composite leaf spring. The web material itself has multiple strands that extend in the longitudinal direction along the web, i.e. in the direction of the length of the fiber-reinforced body. Furthermore, the web comprises a row of elements running transversely, which extend transversely (obliquely or generally perpendicular) relative to the length of the fiber-reinforced body.

Further, the teaching of U.S. Pat. No. 3,900,357 describes various spring configurations and production methods for leaf springs made of fiber-reinforced composite materials and the possibilities thereof for application in motor vehicles. What is disclosed is the use of fine filaments or fibers as stress absorbers. The fibers are laid flat against one another and are held together by means of a suitable matrix material, wherein in a single ply these fibers extend essentially in the same direction. Multiple plies, pre-impregnated with a matrix material, can be combined to produce a multi-ply laminar structure. Then, the leaf spring can be encapsulated in the manner of a helix with two layers of composite material. In that context, inter alia initially the first spiral-shaped layer is wrapped in a left-handed helix, and then the second spiral-shaped layer is wrapped in a right-handed helix around the entire leaf spring.

U.S. Pat. No. 4,414,049 has the object of specifying a method for producing a leaf spring with a variable cross section and a variable thickness. In that context, the filament material is braided as a single coherent strand between bolts or bushing elements so as to form a leaf spring. In that context, the more bolts or bushing elements are incorporated, the larger the cross section of the leaf spring.

U.S. Pat. No. 9,194,451 B2 relates to a method for producing a leaf spring in a fiber composite material, in which a bearing eye is formed at at least one axial end. In that context, first a strip of prepreg is prepared and a bearing eye is configured at the respective ends of the strip. In order to form the basic structure of the leaf spring, a plurality of prepreg strips are arranged one on top of another to form a prepreg stack. A leaf spring produced in that manner consists of just a single material and has, at at least one of the axial ends, a bearing eye that is integrated into the leaf spring. Since the leaf spring contains no pairings of different materials, in operation the static and dynamic forces that are transmitted to the leaf spring via the at least one bearing eye are easily taken up in the central portion of the leaf spring as tensile and compressive stresses and thus ultimately converted into heat energy.

JP 57124141 A increases the strength of an end-position eyelet part of a leaf spring, in that both end parts of the leaf spring are wrapped around the beginning of a bushing and the remaining portions are stitched or woven together with the central portion of the leaf spring. This makes it possible to achieve great strength in the region of the eyelet parts, even with simple manufacture.

U.S. Pat. No. 4,565,356 illustrates a possibility for coupling the fiber material with the bushings in order to reduce stress concentrations in the leaf spring. In that context, the bushing comprises a tubular section with a central opening, wherein rib bundles extend outward from the tubular section.

U.S. Pat. No. 4,749,534 also discloses a production method for a composite leaf spring, which aims to better distribute the load by varying the breadth of the leaf spring. The leaf spring produced in that context is also equipped with an attachment eye. The coupling between the attachment eye and the leaf spring is established by means of metal inserts.

EP 0 215 365 A2 relates to a fiber-reinforced plastic leaf spring, in which cylindrical bushings are present at the ends and are surrounded by fiber strands, and a retaining device is attached in the middle. This invention provides that the fiber strands extending from bushing to bushing are formed so as to surround the bushings and, after passing around the bushings, end at the continuous fiber strands.

A method known from U.S. Pat. No. 4,468,014 provides a composite leaf spring which is produced by positioning layers spaced apart from one another in a mold and subsequently pouring material into the space or injecting the core material into the space between the layers. Preferably, shells which form the mold have a constant breadth and thickness in order to reduce production costs. In most common automotive applications, the spring would have a point of maximum thickness in the middle section, where the bending moment is greatest, and would taper toward each end.

U.S. Pat. No. 4,696,459 provides a plastic leaf spring with two plate-shaped reinforcing elements. According to one advantageous embodiment, the reinforcing elements are connected to one another and to the end of the leaf spring by bolts.

In light of the prior art presented here, production methods for leaf springs made of fiber-reinforced plastic or composite material still leave room for improvement. The invention is therefore based on the object of providing an improved production method for high-strength, long-lived, lightweight and cost-effective leaf springs made of fiber-reinforced plastic with integrated eye bushings, wherein in particular identical or uniform wall thicknesses are to be achieved everywhere in the leaf spring. The invention is also based on the object of providing such a leaf spring.

SUMMARY

According to the various embodiments of the disclosure, a method for producing a fiber-reinforced plastic leaf spring is provided, in particular one suitable for application in a motor vehicle.

It is to be pointed out that the features and measures specified individually in the following description may be combined with one another in any desired technically meaningful way and disclose further configurations of the invention. The description, in particular in conjunction with the figures, characterizes and specifies the invention further.

A method is provided for producing a fiber-reinforced plastic leaf spring, such as typically used in a motor vehicle. Leaf springs, whether made of metal or fiber-reinforced plastic, have an elongate leaf spring main body. This leaf spring main body is almost always curved. In order to act as a bending spring, both the ends of the elongate main body and the summit of the curve are mounted appropriately. When a force acts on the bending spring, for example caused by a pothole in the road, the bending spring deforms with a reduction in the curvature. In the process, energy from the impact is converted into internal energy in the leaf spring. Once the force is removed, the bending spring attempts to return to its initial shape, that is to say to its original radius of curvature. Two eye bushings are provided at the ends of the leaf spring main body for mounting the leaf spring. The at least two eye bushings have two bushing elements, of generally circular cylindrical shape, for example configured as metal inserts, and each having a central axis.

In the case of a fiber-reinforced plastic leaf spring, both the main body and the eye bushings are made of at least two layers of a plastic and/or composite material, for example prepreg. In that context, it is in principle possible to use the known production methods described above. According to the invention, each of the layers is guided along a centerline of the leaf spring to form the leaf spring main body. The centerline connects the center axes of the bushing elements and replicates the curvature profile of the leaf spring. One possible profile for the centerline is along the contact surface of the two layers which form the main body of the leaf spring. In the end regions of the elongate leaf spring, the layers are wrapped around the center axes of the bushing elements to form the two eye bushings.

According to a first step in a method, the first layer is wrapped around the first bushing element in a first circumferential direction and around the second bushing element in the same circumferential direction. Thus, the centerline of the leaf spring is preferably not crossed or intersected. In a second step, subsequent to the first step, the second layer is wrapped around both bushing elements in a second circumferential direction counter to the first circumferential direction, so that once again the centerline is preferably not intersected. This wrapping method permits a robust, long-lived, lightweight and cost-effective integration of the bushing elements into the leaf spring, wherein the fiber profile of the individual layers is not interrupted. After the end of the wrapping of the two layers, the bushing elements, for example metal bushings, are fully enclosed by fiber-reinforced composite material and are thus stably integrated into the leaf spring.

In the context of a further embodiment of the method, in another step following the second step additional layers are in each case wrapped in alternating circumferential directions around the first and the second bushing element, wherein at least in a third step a third layer is wrapped in the first circumferential direction around the first bushing element and in the same first circumferential direction around the second bushing element.

In other words, more than two layers of fiber-reinforced plastic material are used to form the plastic leaf spring. This produces suspension systems that are more stable and capable of supporting greater loads, for example for heavier vehicles. In that context, the layers are wrapped around the bushing elements in circumferential directions that alternate with respect to one another. For example, if the first layer is wrapped around both bushing elements in the clockwise direction, the second layer is wrapped around both bushing elements in the counter-clockwise direction. Finally, the third layer is wrapped around both bushing elements, once again in the clockwise direction, while the fourth layer is wrapped around both bushing elements, once again in the counter-clockwise direction. This is repeated until the desired wall thickness of fiber-reinforced plastic has been achieved.

According to an advantageous embodiment of the production method according to the present disclosure, each of the layers is guided in just one ply along the centerline. In so far as the wall thickness of the fiber-reinforced plastic is to grow evenly with each added layer, it is important to ensure that each layer is always guided in one ply along the centerline. Thus, two-ply guiding of the layer, for example folding and returning, is to be avoided.

According to a further embodiment, each of the layers is guided along just one side of the centerline, wherein the layers are guided alternately on respective different sides of the centerline. Insofar as the wall thickness of the fiber-reinforced plastic is to grow evenly on either side of the centerline, it is important to ensure that, when multiple layers of fiber-reinforced plastic are used, the layers are always guided on alternating sides along the centerline. Since, owing to an alternating wrapping direction in a first and a second circumferential direction, the ends of the respective layers rest on opposite sides of the centerline in the region of the eye bushings, and run along the centerline in just one ply, it is possible to form an overall uniform wall thickness both in the region of the eye bushings and in the region of the leaf spring main body.

According to an even further embodiment, the layers in the region of the first and second eye bushings are arranged opposite one another, wherein each of the layers fully surrounds the respective underlying layer in the region of the first and second eye bushing. That is to say that each layer completely surrounds the respective underlying layer in the region of the two eye bushings. Thus, the starting point and the end point of a new layer are chosen to be in the transition region between the main body and the eye bushings. Once the first eye bushing has been wrapped and the underlying layer has been fully covered, at least along the circumference, that is to say in the circumferential direction, the layer is guided along the centerline and is wrapped around the second eye bushing, so that once again the underlying layer is fully covered. This manner of wrapping means that the wall thickness, or the used material of fiber-reinforced plastic, in the region of both eye bushings is the same at each point on the circumference. By virtue of the fact that each layer is guided in one ply along the centerline, and the start and end point of a respective layer lies on different, opposite sides of the centerline, the wall thickness or material thickness of the elongate leaf spring main body also corresponds to the wall thickness or material thickness in the region of the eye bushings. Thus, the wall thickness of the leaf spring is uniform overall. This produces improved spring properties and increased lifespan.

In various examples, the method and the resulting leaf spring uses only an odd number of layers, preferably three or five layers.

In an embodiment of the method, where an odd number of layers is used, the centerline forms a curve and the number of layers that is arranged on a side of the centerline having a smaller radius of curvature is greater than the number of layers that is arranged on a side having a larger radius of curvature. Consequently, the wall thickness on that side of the centerline having the smaller radius of curvature is greater than on that side having the larger radius of curvature. As a result, the leaf spring is stronger in that region which is loaded in tension, even under relatively high loads.

In various embodiments, each layer, that is to say also each ply, is realized in one piece. Thus, the layers do not consist of multiple different regions joined together. This simplifies the production process. For each layer a continuous strip of a plastic and/or composite material, for example prepreg, is provided, the length of the strip being dependent on its position. Thus, a strip for a layer at a smaller radial distance from the respective center axes of the bushing elements is shorter than a strip for a layer at a greater radial distance from the respective center axes of the bushing elements. This equalizes, on one hand, the circumference of the eye bushings that increases with each layer and, on the other hand, the offset of the respective start and end points.

According to various embodiments, the bushing element may be realized as a one-piece metal bushing, or in multiple parts with an outer metal sleeve, an inner metal sleeve and a rubber-like insert, in particular a rubber insert.

According to another embodiment, a leaf spring is provided with an elongate leaf spring main body which has a first eye bushing at a first end and a second eye bushing at a second end. In that context, the leaf spring main body and the first and second eye bushings are formed using at least a first layer and a second layer of a plastic and/or composite material, for example prepreg. Each of the layers is guided along a centerline of the leaf spring main body to form the leaf spring main body and, to form the first and second eye bushings, is respectively wrapped around a bushing element having a first center axis and around a bushing element having a second center axis. Each of the layers of the leaf spring runs in one ply along the centerline, the first layer being wrapped in a first circumferential direction around the first bushing element and in the same circumferential direction around the second bushing element such that the first layer runs along a first side of the centerline. The second layer is wrapped, counter to the first circumferential direction, around the first bushing element and in the same circumferential direction around the second bushing element such that the second layer runs along a second side, opposite the first side, of the centerline. Both the leaf spring main body and the first and second eye bushings respectively have a uniform wall thickness. Accordingly, each further layer can run in alternation so as to form a uniform wall thickness.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different figures, identical parts are always provided with the same reference signs, and so said parts are generally also described only once.

Figure 1:
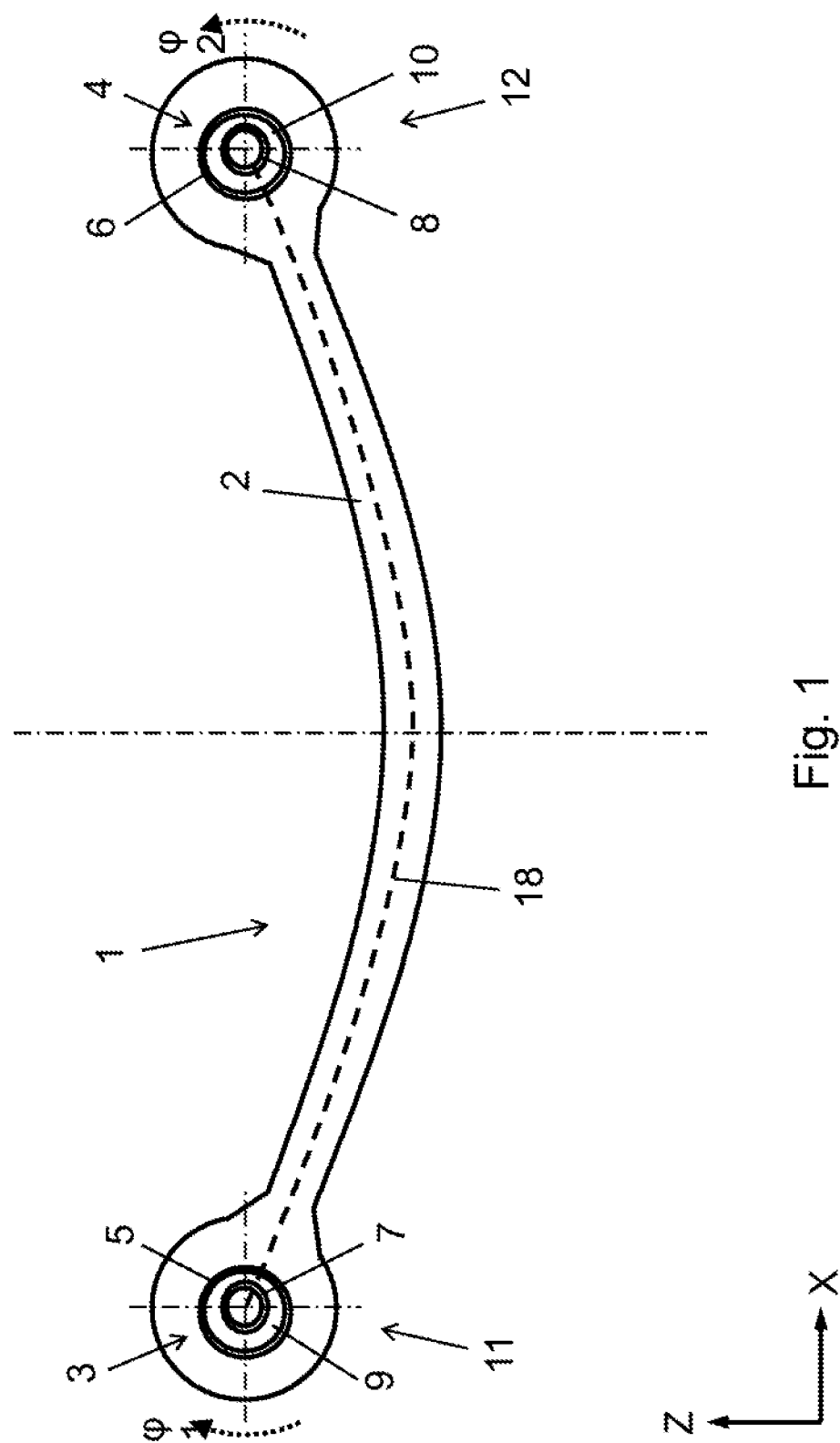
FIG. 1 is a schematic side view of an exemplary embodiment of a leaf spring according to the invention, with integrated eye bushings.

FIG. 1 shows an exemplary embodiment of a leaf spring 1 according to the invention, made of fiber-reinforced plastic or composite material, which has a leaf spring main body 2 with a first and a second integrated bushing element 3, 4 for mounting and/or securing the leaf spring 1, for example in a spring system of a vehicle shock damping arrangement. The first bushing element 3 comprises an outer metal sleeve 5, an inner metal sleeve 7 and a rubber insert 9. The second bushing element 4 also comprises an outer metal sleeve 6, an inner metal sleeve 8 and a rubber insert 10. The bushing elements 3, 4 are positioned at opposite ends of the leaf spring 1. The depicted leaf spring 1 is axisymmetric and has an arcuate or curved profile. The dashed centerline 18 is an imaginary line connecting a center axis z3 of the first bushing element 3 and a center axis z4 of the second bushing element 4. The centerline 18 replicates the curvature profile of the leaf spring 1. If the leaf spring 1 experiences a mechanical load, the curvature decreases. When the load is removed, the curvature returns to its original profile.

Figure 2:
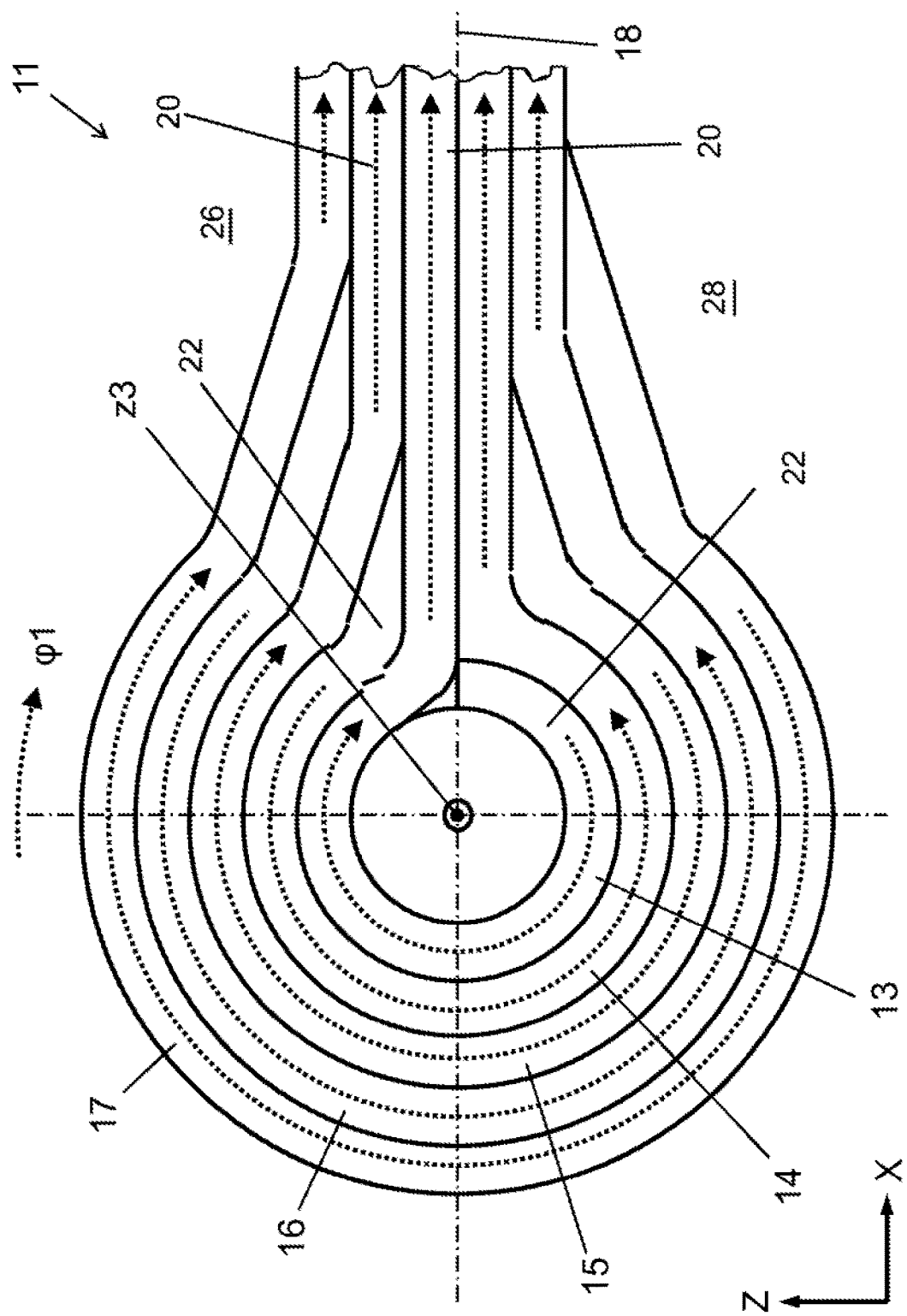
FIG. 2 is a schematic side view of a first eye bushing of the exemplary embodiment of FIG. 1.
Figure 3:
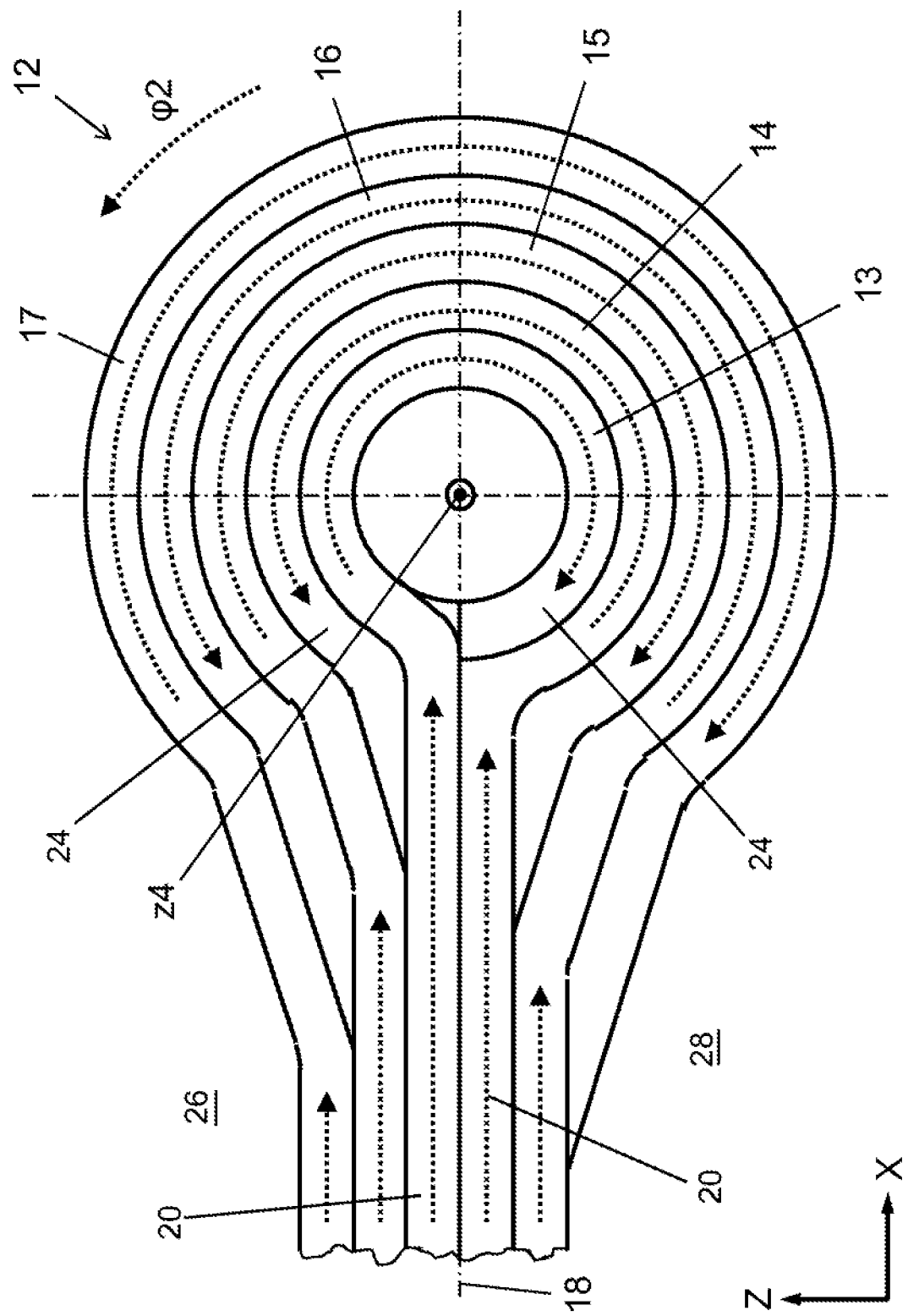
FIG. 3 is a schematic side view of a second eye bushing of the exemplary embodiment of FIG. 1.

The wrapping sequence of an embodiment of a production method according to the present disclosure is illustrated in the same manner by the schematic side views for the first eye bushing 11 and the second eye bushing 12 in FIGS. 2 and 3. Various layers of fiber-reinforced composite material 13, 14, 15, 16 and 17, for example layers of resin mats, are wrapped according to the following method sequence:

In a first step, a first layer 13 is wrapped in a first circumferential direction $\varphi 1$, as indicated by the arrow directions shown, clockwise around the first bushing element 3 (FIG. 2). Then, the first layer 13 is guided along the centerline 18 of the leaf spring 1 and finally wrapped around the second bushing element 4 clockwise in the first circumferential direction $\varphi 1$ (FIG. 3).

In a second step, a second layer 14 is wrapped in a second circumferential direction $\varphi 2$, as indicated by the arrow directions shown, counter-clockwise around the first bushing element 3 (FIG. 2). Then, the second layer 14 is guided along the centerline 18 of the leaf spring 1 and finally wrapped around the second bushing element 4 counter-clockwise in the second circumferential direction $\varphi 2$ (FIG. 3).

In a third step, a third layer 15 is wrapped in the first circumferential direction $\varphi 1$, as indicated by the arrow directions shown, clockwise around the first bushing element 3 (FIG. 2). Then, the third layer 15 is guided along the centerline 18 of the leaf spring 1 and finally wrapped around the second bushing element 4 clockwise in the first circumferential direction $\varphi 1$ (FIG. 3).

In a fourth step, a fourth layer 16 is wrapped in the second circumferential direction $\varphi 2$, as indicated by the arrow directions shown, counter-clockwise around the first bushing element 3 (FIG. 2). Then, the fourth layer 16 is guided along the centerline 18 of the leaf spring 1 and finally wrapped around the second bushing element 4 counter-clockwise in the second circumferential direction $\varphi 2$ (FIG. 3).

In a fifth step, a fifth layer 17 is wrapped in the first circumferential direction $\varphi 1$, as indicated by the arrow directions shown, clockwise around the first bushing element 3 (FIG. 2). Then, the fifth layer 17 is guided along the centerline 18 of the leaf spring 1 and finally wrapped around the second bushing element 4 clockwise in the first circumferential direction $\varphi 1$ (FIG. 3).

Depending on the desired thickness of the leaf spring 1, as many layers as desired can be wrapped in further steps according to the above sequence. In each successive step, the start and end points of the respective layers 13, 14, 15, 16 and 17, and of further layers, are offset in the direction of the leaf spring main body 2, or the respective distance with respect to the corresponding center axis z1 or z2 is increased.

This layer-by-layer construction permits a constant wall thickness in all regions, both along the leaf spring main body 2 and in the regions of the eye bushings 3, 4. If the first layer 13 is first wrapped counter-clockwise, the overlying layers alternate accordingly. As the wall thickness of the fiber-reinforced plastic increases, the start and end points of a respective layer become ever further from the center axes z3, z4 of the bushing elements.

As shown in FIGS. 2-3, each layer has a central region 20 extending between a first end region 22 and a second end region 24. Each layer terminates at their respective first and second end regions 22, 24. The first end region 22 of each layer wraps about the first bushing element or bushing 3. The second end region 24 of each layer wraps around the second bushing element or bushing 4.

As shown in the Figures, the central regions 20 of the first and second layers 13, 14 extend along and are positioned on only first and second sides 26, 28 of a curved spring centerline 18, respectively. The central regions 20 of each of the layers extend as a single ply between the first and second bushings 3, 4.

With reference to FIGS. 2-3, odd layers, e.g. the first, third, and fifth layers 13, 15, 17, overlay and are in contact with one another on a first side 26 of the centerline 18 of the spring between the first and second bushings. Even layers, e.g. the second and fourth layers 14, 16, overlay and are in contact with one another on the second opposite side 28 of the centerline 18 of the spring between the first and second bushings. The layers 13, 14, 15, 16, 17 may be sequentially numbered, and either odd or even, starting with the first layer 13 in contact with and closest to the bushings 3, 4.

With further reference to FIGS. 2-3, the layers 13, 14, 15, 16, 17 are sequentially wound and overlaid around each of the first and second bushings 3, 4. Each end region 22, 24 of the first layer 13, or another odd layer, terminates on the second side 28 of the spring centerline 18 adjacent to an associated bushing 3, 4. Each end region 22, 24 of the second layer 14, or another even layer, terminates on the first side 26 of the spring centerline 18 adjacent to an associated bushing 3, 4. For example, each end region 22, 24 of the first layer 13 is positioned between an associated bushing 3, 4 and end region 22, 24 of the second layer 14. Each end region 22, 24 of the second layer 14 is positioned between an associated end region 22, 24 of the first layer 13 and an associated end region 22, 24 of the third layer 15.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A method for producing a fiber-reinforced leaf spring for use in a motor vehicle, the method comprising:

forming an elongate leaf spring main body with a first eye bushing at a first end and a second eye bushing at a second end using at least a first layer and a second layer of a plastic and/or composite material;

guiding each of the layers along a centerline of the leaf spring main body to form the leaf spring main body and to form the first and second eye bushings;

wrapping the first layer around a first bushing element having a first center axis in a first circumferential direction and around a second bushing element having a second center axis in the same, first circumferential direction such that a first end region of the first layer terminates adjacent to the first bushing, a second end region of the first layer terminates adjacent to the second bushing and is spaced apart from the first end region of the first layer, and a central region of the first layer between the first and second end regions is guided along only a first side of a curved spring centerline; and wrapping the second layer in a second circumferential direction, counter to the first circumferential direction, around the first bushing element and in the same, second circumferential direction around the second bushing element such that a first end region of the second layer terminates adjacent to the first bushing, a second end region of the second layer terminates adjacent to the second bushing and is spaced apart from the first end region of the second layer, and a central region of the second layer between the first and second end regions is guided along only a second side of the curved spring centerline, the second side of the spring centerline opposite to the first side of the spring centerline.

2. The method of claim 1 further comprising:
wrapping a third layer in the first circumferential direction around the first bushing element and, in the same, first circumferential direction, around the second bushing element.

3. The method of claim 2, wherein each of the first, second, and third layers is in one piece.

4. The method of claim 2, wherein the first, second, and third layers are arranged one on top of another at least in a region adjacent to the first and second eye bushing, wherein each of the layers completely surrounds the respective underlying layer, at least in the region adjacent to the first and second eye bushing.

5. The method of claim 2, wherein the centerline forms a curve and the first and third layers are arranged on a first side of the centerline with a first radius of curvature, and the second layer is arranged on a second side of the centerline having a second radius of curvature, the second radius of curvature being greater than the first radius of curvature.

6. The method of claim 1 further comprising wrapping a plurality of additional layers around the first and second bushing elements, wherein the plurality of additional layers are wrapped in alternating first and second circumferential directions around the first and the second bushing element.

7. The method of claim 6, wherein the first layer, the second layer and the plurality of additional layers total an odd number of layers.

8. The method of claim 1, wherein the first layer is wrapped prior to the second layer being wrapped.

9. The method of claim 1, wherein each of the first and second layers are guided only in one ply along the centerline.

10. The method of claim 1, wherein the first and/or the second bushing element has an outer metal sleeve, an inner metal sleeve, and a rubber-like insert positioned therebetween.

11. The method of claim 1, wherein the composite material further comprises prepreg.

12. A fiber-reinforced leaf spring for use in a motor vehicle, the leaf spring comprising:
first and second bushing elements; and
an elongate leaf spring main body formed by the method of claim 1, the main body with first and second eye bushings extending around the first and second bushing elements, respectively.

13. The method of claim 1, wherein the first layer is wrapped in the first circumferential direction such that the first layer does not cross the curved spring centerline between the first and second bushings; and wherein the second layer is wrapped in the second circumferential direction such that the second layer does not cross the curved spring centerline between the first and second bushings.

14. A leaf spring comprising:
a first bushing and a second bushing;
a first fiber-reinforced composite layer having a central region extending between opposite first and second end regions; and
a second second fiber-reinforced composite layer layer having a central region extending between opposite first and second end regions;
wherein the first and second end regions of each layer are wrapped about first and second bushings, respectively, such that the first end region of each layer terminates adjacent to the first bushing, and the second end region of the each layer terminates adjacent to the second bushing;
wherein each end region of the first layer is positioned between an associated bushing and an associated end region of the second layer;
wherein the central region of the first layer extends along only a first side of a curved spring centerline; and
wherein the central region of the second layer extends along only a second side of the curved spring centerline.

15. The leaf spring of claim 14, wherein each end region of the first layer terminates on the second side of the spring centerline adjacent to an associated bushing; and
wherein each end region of the second layer terminates on the first side of the spring centerline adjacent to an associated bushing.

16. The leaf spring of claim 15, wherein the central regions of each of the first and second layers extend as a single ply between the first and second bushings.

17. The leaf spring of claim 16 further comprising a third fiber-reinforced layer having a central region extending between opposite end regions wrapped about the first and second bushings, respectively, the central region of the third layer extending along only the first side of the spring centerline and in contact with the central region of the first layer;
wherein each end region of the second layer is positioned between an associated end region of the first layer and an associated end region of the third layer.

18. The leaf spring of claim 17 further comprising first and second bushings, each bushing having a metal outer wall and a metal inner wall, wherein the leaf spring has a constant wall thickness at the bushings and along the centerline of the spring.

19. A fiber-reinforced leaf spring for use in a motor vehicle, the leaf spring comprising:
a first bushing element having a first center axis;
a second bushing element having a second center axis; and
an elongate leaf spring main body with a first eye bushing at a first end and a second eye bushing at a second end, wherein the leaf spring main body and the first and second eye bushings are formed using at least a first layer and a second layer of a plastic and/or composite material, wherein each of the layers runs along a centerline of the leaf spring main body to form the leaf spring main body and, to form the first and second eye bushings, is respectively wrapped around the first bushing element and around the second bushing element;
wherein each of the layers runs in only one ply along the centerline;

wherein the first layer is wrapped in a first circumferential direction around the first bushing element and in the same first circumferential direction around the second bushing element, such that a first end region of the first layer terminates adjacent to the first bushing element, a second end region of the first layer terminates adjacent to the second bushing element, and a central region of the first layer between the first and second end regions only runs along a first side of the centerline between the first and second bushing elements;

wherein the second layer is wrapped in a second circumferential direction, counter to the first circumferential direction, around the first bushing element and in the same second circumferential direction around the second bushing element, such that a first end region of the second layer terminates adjacent to the first bushing element, a second end region of the second layer terminates adjacent to the second bushing element, and a central region of the second layer between the first and second end regions runs only along a second side, opposite the first side, of the centerline between the first and second bushing elements; and wherein the leaf spring main body and the first and the second eye bushing all have a uniform wall thickness.

20. The leaf spring of claim 19, wherein the composite material further comprises prepreg.

\* \* \* \* \*